United States Patent [19]
Gallagher et al.

[11] Patent Number: 5,907,603
[45] Date of Patent: May 25, 1999

[54] DATABASE-DRIVEN AUTOMATIC MESSAGE ACCOUNTING SYSTEM AND METHOD

[75] Inventors: Kevin Gallagher; Donald W. Miller, Jr., both of Plano; Kathy J. Brandt, Dallas; Marvin E. Pasek, Irving, all of Tex.

[73] Assignee: Alcatel USA, Inc., Plano, Tex.

[21] Appl. No.: 08/757,465

[22] Filed: Nov. 27, 1996

Related U.S. Application Data

[60] Provisional application No. 60/017,895, May 17, 1996.
[51] Int. Cl.$^6$ .................................................. H04M 15/00
[52] U.S. Cl. .......................... 379/133; 379/114; 379/127; 379/126
[58] Field of Search .......................... 379/111–115, 116, 379/120–121, 126, 119, 133–134, 127

[56] References Cited

U.S. PATENT DOCUMENTS

| 4,979,207 | 12/1990 | Baum et al. | 379/126 |
|---|---|---|---|
| 5,003,584 | 3/1991 | Benyacar et al. | 379/119 |
| 5,159,698 | 10/1992 | Harrington et al. | 379/112 |
| 5,218,632 | 6/1993 | Cool | 379/112 |
| 5,333,183 | 7/1994 | Herbert | 379/112 |
| 5,488,648 | 1/1996 | Womble | 379/13 |
| 5,809,121 | 9/1998 | Elliott et al. | 379/127 |

Primary Examiner—Paul Loomis
Assistant Examiner—Duc Nguyen
Attorney, Agent, or Firm—Baker & Botts, L.L.P.

[57] ABSTRACT

The automated system and method (10) uses a plurality of tables (64, 66, 74, 76, 76') to define the structure and formats of the call data blocks (60) and the destination call or event records (100). These tables (64, 66, 74, 76, 76') are accessed at run time to determine the structure, data definition, data format and size and the call/event records (100) are generated according to the tables.

29 Claims, 5 Drawing Sheets

DATABASE-DRIVEN AUTOMATIC MESSAGE ACCOUNTING SYSTEM AND METHOD

CROSS REFERENCE TO RELATED APPLICATION

This application claims the benefit of United States Provisional application Ser. No. 60/017,895, filed on May 17, 1996.

TECHNICAL FIELD OF THE INVENTION

This invention is related in general to the field of telecommunications. More particularly, the invention is related to a database-driven automatic message accounting system and method therefor.

BACKGROUND OF THE INVENTION

Telephone companies collect information on calls made by its customers to create billing statements, monitor and diagnose system performance, and manage the telephone network. The collected information is formatted into individual files commonly termed call records. A call record may pertain to a single call or multiple calls made over a predefined time period. The call records may also include different sets of information, some with more detailed data than others, as defined by the telephone companies. Because call records have many uses, each telephone company may desire to receive call records with a number of unique and different formats to satisfy its own needs. Over time, telephone companies may further desire to alter the format of one or more of the call records to suit changing needs.

Currently because call data collection and call record formatting software are hard-coded, software engineers must spend many hours to generate or modify the source code of the computer programs performing these tasks in order to tailor them to the needs of each telephone company. The same also must be done when a telephone company desires to change one of its call record formats. The new or modified source code must then be debugged and recompiled before it can be brought on-line. As a result, long lead time is typically required to make any change to the call data collection and call record format and the call record collection process is rigid and not easily adaptable to changing needs.

SUMMARY OF THE INVENTION

Accordingly, there is a need for call data collection and call record formatting that may be modified or converted to a different structure and format easily without the long lead time typically required of conventional systems.

According to one aspect of the invention, an automated system receives a plurality of call data blocks each having data items related to at least one telephone call. The system includes at least one table indexable by a data item in the call data block for determining a call/event record structure in response to a call type and call condition associated with the telephone call, and a process accesses the call data blocks for retrieving the data items, and creating the call/event records with the retrieved data items according to the at least one table.

According to another aspect of the invention, an automated system includes at least one structure selection table having data structure information corresponding to a call type and call condition associated with the telephone call, and a structure definition table having definitions of each field in the call data blocks and corresponding call/event records for the call type and call condition of the telephone call. A process accesses the call data blocks, retrieves the data items, and creates the call records with the retrieved data items according to the at least one structure selection table and structure definition table.

According to yet another aspect of the invention, an automated method for processing call data blocks includes the steps of collecting a plurality of call data blocks associated with a plurality of telephone calls, and using a predetermined data item in each call data block, accessing a structure selection table according to a call type and call condition of the telephone call for determining data structures of the call data block and a call/event record. Then a plurality of fields of the call data block and the call/event record are defined according to a structure definition table. The data are retrieved from the call data block according to the structure definition table, and then inserted into the call/event record according to the structure definition table.

A technical advantage of the system and method of the instant invention is the ease in which call records and event records structure and format may be changed and switched. Telephone company requests for changing the record format can now be fulfilled without long lead time spent in modifying software code, debugging, and recompiling the code.

BRIEF DESCRIPTION OF THE DRAWINGS

For a better understanding of the present invention, reference may be made to the accompanying drawings, in which.

DETAILED DESCRIPTION OF THE INVENTION

Figure 1:
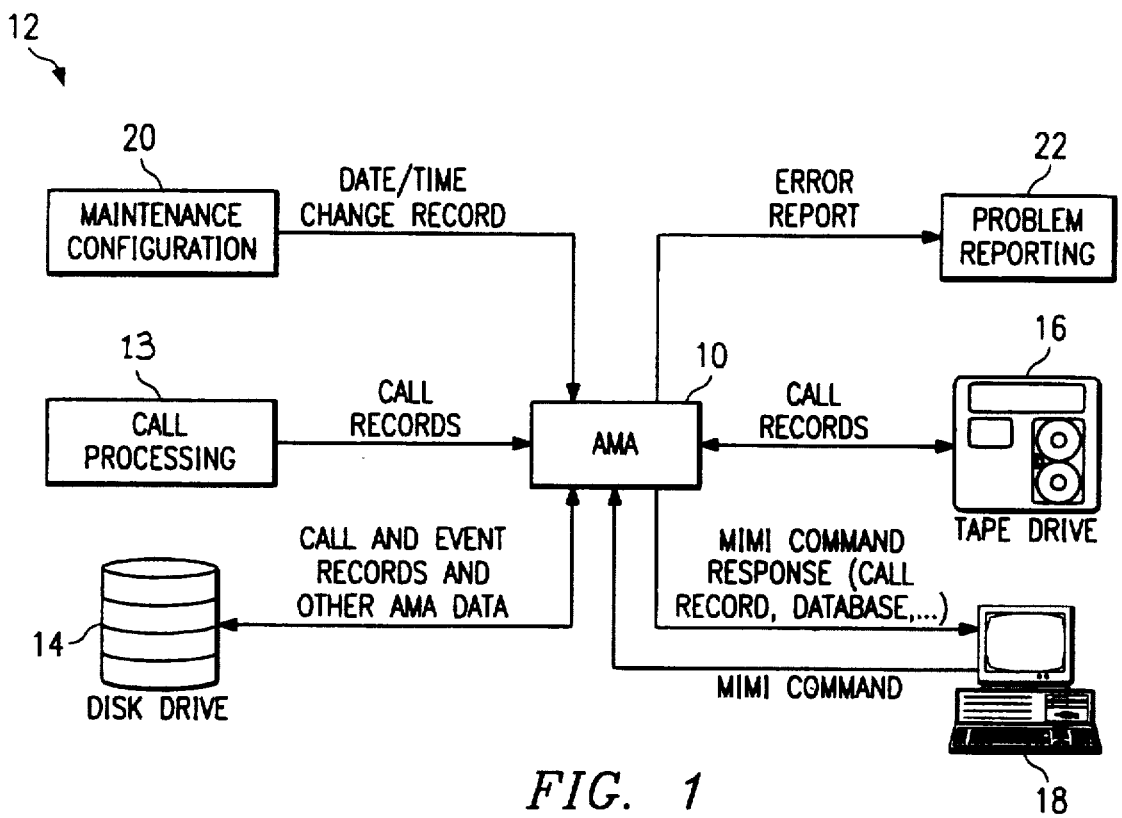
FIG. 1 is a simplified exemplary block diagram of a database-driven automatic message accounting system's interaction with other systems in its operating environment.

The preferred embodiment(s) of the present invention is (are) illustrated in FIGS. 1–6, like reference numerals being used to refer to like and corresponding parts of the various drawings.

Referring to FIG. 1, a database-driven automatic message accounting (AMA) system 10 constructed according to the teachings of the present invention is shown in an exemplary operating environment 12. Automatic message accounting system 10 interfaces with a call processing system 12, which records the data associated with each telephone call. The data is stored in a buffer (not shown) and then transferred to automatic message accounting system 10 after the buffer is full or after a predetermined period of time. Ama may optionally format the call records received from call processing system 12 and store them into a collection buffer. When full, or after a predefined time period, the collection buffer contents are written to a memory device such as a storage disk 14. The data may then be copied from disk 14 to another storage medium such as magnetic tapes 16 for transfer to the telephone companies.

Also stored in disk 14 are event records and other data that are generated by ama or other systems. Event records are data that record various switch events that have occurred. The event records are inserted into the collection buffer with the call records and then transferred to disk 14.

Man-machine interface (MMI) commands may be received by ama through a user interface device such as a computer terminal 18 to allow an user to extract and display ama data, including call records, event records, billing statistics, and the contents of the ama databases. Through user interface 18, commands may be entered to change ama data and instruct ama to perform certain tasks, such as downloading batch files to tape drive 16.

A maintenance configuration system 20 may further interface with ama to inform it of date and/or time changes so that call records and other data bear the correct time and date information. Further, ama may generate error reports and transmit this information to a problem reporting system 22 to handle and alert operators and management.

Figure 2:
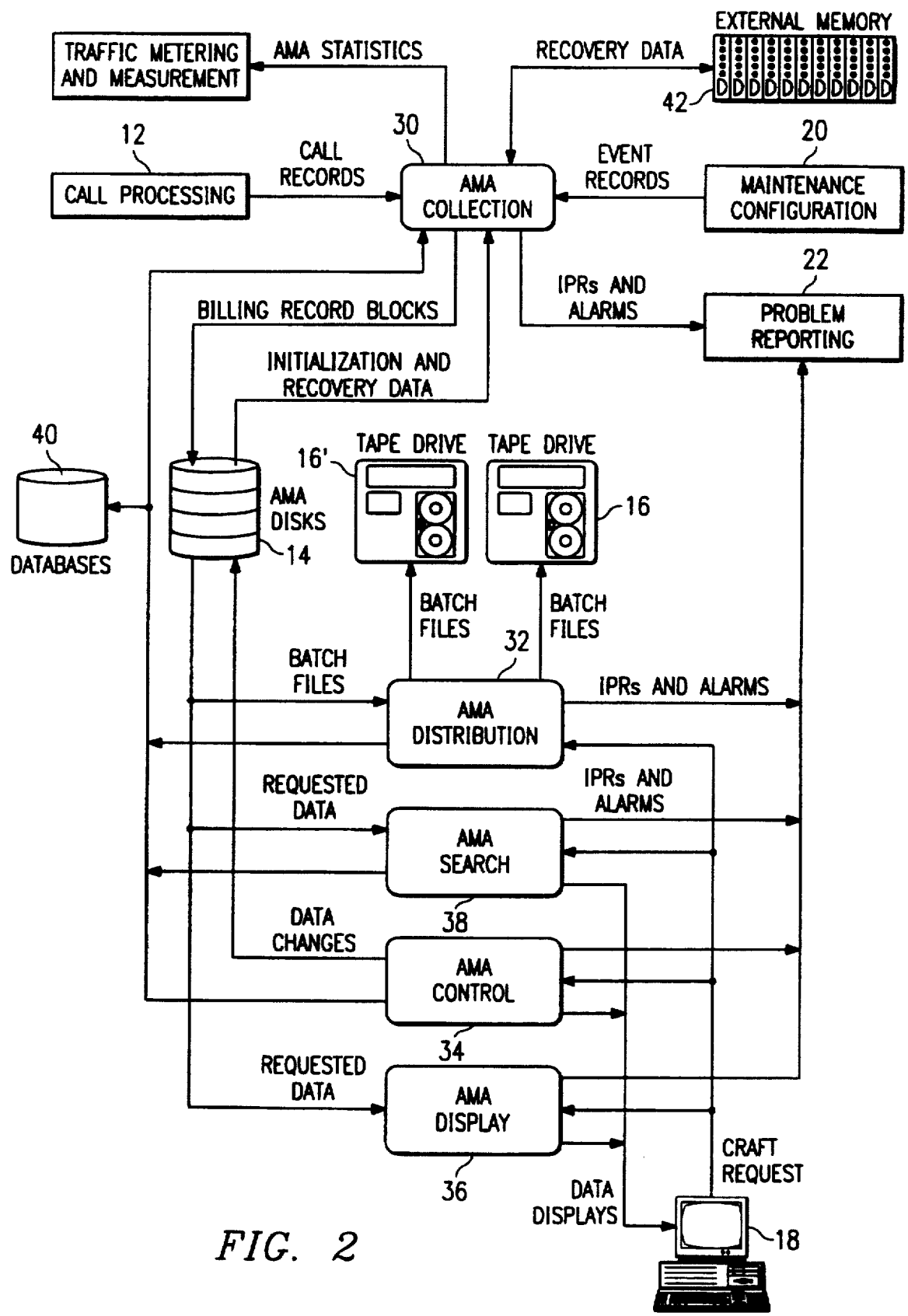
FIG. 2 is a more detailed exemplary functional block diagram of a database-driven automatic message accounting system according to the teachings of the present invention.

Referring to FIG. 2, ama is shown in its functional components: collection 30, distribution 32, control 34, display 36, and search 38. It is worthwhile to note that the functional partition described herein is exemplary and does not preclude other partitions. All functional components are database-driven to provide flexibility and the ability to change task performance quickly without explicit coding or recoding. The database, tables, and their operation are described in detail below.

Collection 30 collects and stores all received call records from call processing system 12 and event records generated from within collection 30 itself or received from other systems such as maintenance configuration system 20. The call records and event records are optionally formatted into billing record blocks and stored in disk 14. The format of the billing record blocks are defined by a plurality of tables stored in a database 40. In case of a processor failure, billing data can be recovered from an external memory 42 and/or disk 14. Collection 30 further issues information problem reports (IPR) and alarms to problem reporting system 22.

Distribution function 32 primarily provides the ability to dump one or more batch files from disk 14 to a magnetic tape 16 or to copy from one tape 16 to another 16'. Distribution 32 may receive craft input received by user interface 18 to perform the transfer of batch files. The status of on-going dump batch tasks such as the current block number being transferred is kept in database 40. The batch file transfer task may be performed as a batch job.

Control function 34 allows craft personnel to access and modify information about automatic message and accounting activity. For example, one control functionality may allow craft to manually close the current open batch file and to open a new batch file to accept subsequent data transfers. Another exemplary functionality may allow craft to change the size of the batch file and the time period that each batch file may stay open. Further, the thresholds used to issue major and minor alarms as the collection file fills up with billing records may also be changed via control 34. The batch file closure values and alarm thresholds are defined in database 40. It is also possible to switch between two billing record block collection formats through control 34.

Display 36 allows craft personnel to access and display information about system activity. For example, the current status of the batch files currently residing on disk 14, such as which files are open, closed, dumped, being dumped, or overwritten, can be displayed on user interface 18. Craft personnel may also view the current settings of the batch file closure values and alarm thresholds.

Search 38 allows craft personnel to search batch files for particular call records and event records. Search criteria on selected fields in the call and event records may be established to focus and direct the search.

Figure 3:
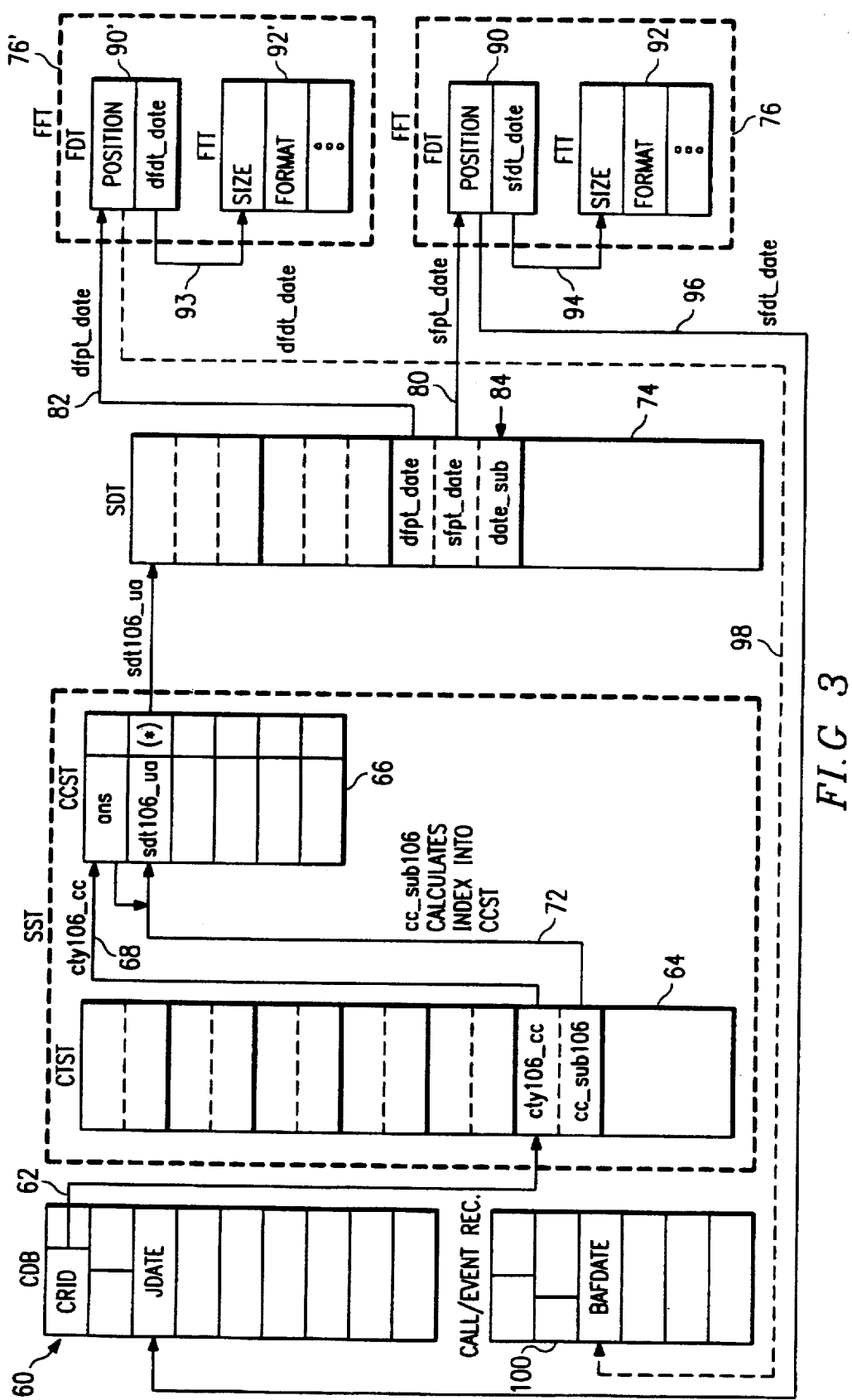
FIG. 3 is a block diagram illustrating an exemplary call and event record formatting process according to the teachings of the present invention.

As discussed briefly above, automatic message accounting tasks are database-driven, i.e., the functional components access tables that direct their performance. FIG. 3 shows how call and event record formatting is performed with collection format definition tables.

Within a collection format definition database, a number of tables are stored that define how data are to be extracted from a first data structure, optionally reformatted, and then inserted into predetermined locations in a second data structure. The collection format definition database tables define the data structures, the fields within the data structures, and how data are to be manipulated.

Referring to FIG. 3, a call data block (CDB) 60 is received from call processing system 12 (FIGS. 1 and 2), which contain data about a single call or multiple calls made over a period of time. Call data block includes a plurality of fields, including a call record identifier (CRID). The call record identifier is used to identify certain structural selection tables (SST) to determine the call type and call condition of the calls. In particular, the call record identifier is used as an index into a call type selection table (CTST) 62 to locate the proper call type entry, as shown by arrow 62. Call type selection table contains one entry for each possible call record type (e.g. flat rate, message rate, etc.) as identified by its own unique identifier. A field in call type selection table 62 is a pointer, for example cty106_cc, to an entry in a call condition selection table (CCST) 66, as shown by arrow 68, which defines the call conditions (answered, unanswered, etc.) for the particular call type identified by call record identifier. Another field in the entry in call type selection table 62 is a pointer to a program, for example cc_sub106, which may be used to determine the condition of the call and calculate an index for that call condition in to the selected entry, as shown by arrow 72. The computed index into call condition selection table 66 produces another pointer, sdt106_ua, to a structure definition table (SDT) 74 and a flag shown as (*) to indicate whether a call record should be produced for that particular call type and call condition.

Each entry in structure definition table 74 defines a single field or a combined group of fields for a call or event record format. The entries may be grouped such that each record format that is valid for a particular application is described by a set of consecutive entries. For example, five consecutive entries in structure definition table, 0–4, may be used to define the five fields in record type A, and two consecutive entries, 5 and 6, may be used to define the two fields in record type B. Further, the order of appearance of entries defining each field of a record type is the same as the order of appearance of the corresponding field in the actual record.

Each entry in structure definition table 74 includes a pointer (sfpt_date) to field formatting tables 76 which define the source data, for example the date, format and location (arrow 80); a pointer (dfpt_date) to field formatting tables 76' which define the destination data format and location (arrow 82); and a pointer 84 to a program (date_sub) which is used to perform any required data processing or manipulation prior to inserting the data into the destination data structure.

There are at least two types of field formatting tables: field definition table (FDT) 90 and 90' and field translation table (FTT) 92 and 92'. Field definition table 90 and 90' defines the placement of the data item in a structure. It contains the byte and bit positions of the data item within a structure, masks for the first and last bytes of the field to correct for non-byte aligned data, an optional source/destination address for the data for data that are constants not contained in a structure, and a pointer to field translation table 92 and 92' (arrows 93 and 94) which further defines the data. For example, the position field of field definition table 90 indicates that the source of the data is the JDATE field in call data block 60 (arrow 96), and the destination of the data is the BAFDATE field in a call or event record 100 (arrow 98). Collection 30 uses this information to move the data from the source field in call data block 60 to the destination filed in call or event record 100.

Field translation table 92 and 92' further defines the attributes of the data item contained in the field of the source structure or the destination structure. The included attributes may include: data size, data format, fill data value, name of data, validation data (e.g. upper and lower limits), and data conversion routines. The information in field translation table 92 and 92' may be used by the program in structure definition table that processes and manipulates the data prior to inserting the data into the destination field in the call or event record.

In this manner, the fields of call or event record 100 are successively filled with data from call data block 60. Accordingly, to change the format and/or content of the call record or event record, all that are required are changes to the value contained in these tables. No source code alteration or generation is necessary. Further, a number of call/event record structures and definitions may be provided by n sets of tables so that the format of the call/event records may be changed dynamically.

Figure 4:
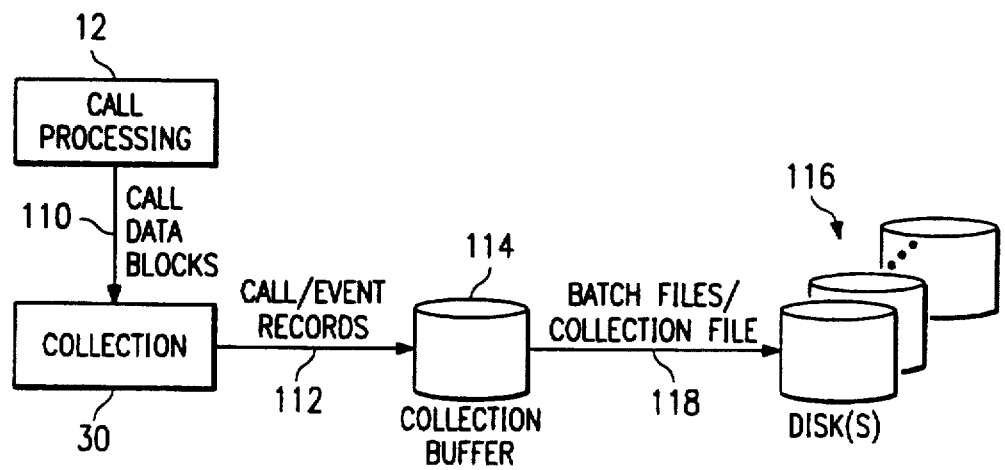
FIG. 4 is a simplified block diagram of an exemplary flow of data.

Referring to FIG. 4, a simplified block diagram shows an exemplary flow of data when data is collected from call processing. Call data blocks 110 are received from call processing 12. Collection 30 then optionally extracts the data in call data blocks 110 and inserts them into call record or event record structures 112 with formats defined by the tables in the collection format definition database described above. The call or event records 112 are then stored in a collection buffer 114. The contents of collection buffer 114 is emptied into one or more disks 116 when full or after a predetermined time period. The contents of collection buffer 114 is formatted into a collection file 118 consisting one or more batch files, which in turn include a number of call or event records. In addition to the collection format definition database, other databases contain information to control the collection process and to provide status thereof.

The collection control database is a database that helps to control the collection process. The collection control database includes a collection control table, which defines all optional processing for collection program 30. The definition includes initialization information, features, debug definitions, log file definitions, and statistics definitions.

A collection threshold table contains the percentages or values used to calculate the threshold for issuing critical, major, and minor alarms. It also contains the batch file automatic closure values. There is an automatic closure size value that causes a batch file to close when the number of disk blocks specified is used. An automatic closure time value is also enclosed that causes a batch file to close on specified time intervals.

A site ID/software release table is owned by ama system 10 but may be referenced by call processing system 12, maintenance configuration system 20, and problem reporting system 22. This table has one entry which contains the site location, site ID, and software release level.

A format version table is used to control the switching between two established formats. This table has an entry which indicates which format version of the call data record format is being used for the generation of billing records. The table also includes a switchover in progress flag, a status flag, and other information.

A periodic event table defines those tasks that are scheduled to run in a periodic manner. The table also contains information that defines when these tasks should be initiated. An entry for a task may include the fixed delta time frequency the event is to run if applicable, the next time the event is to run, and a pointer to the routine to be executed when the event runs. Examples of these tasks or events include the generation of hourly control records, closing the current batch file at midnight to conclude the day, etc.

The collection control database also includes a monitor control table which contains one entry for each event that needs monitoring by the system. The system may observe disk usage thresholds and batch file automatic closure sizes. Each entry contains the address of the routine to be executed for that task.

A collection status database contains tables that provide a snap shot of the collection process. The database includes a collection status table that contains information on the current status of the collection process. This information is used to build the control blocks that are created and appended to the contents in each collection buffer and written as part of that buffer to disk. The construct of an exemplary collection status table 124 and collection file 126 can be seen in FIG. 5. Collection status table 124 records the current collection status information which includes a pointer 128 to the current active entry in a batch file control table 130 that describes the current batch file.

It may be seen that a plurality of call/event records which are also called call detail records (CDR) make up one block in collection file 126. A number of blocks with a control block appended at the end mark the contents of one collection buffer. A batch file is made up of a number of collection buffer contents. A collection file is in turn made up of a number of batch files.

A disk file size table is created when collection system 30 is first initialized. The table contains data that define the number of disks 116 (FIG. 4) on the system, the size of the collection file, the number of entries in the batch file control table (discussed below) and the size of the collection file on each disk. The disk file size table is saved to disk for recovery purposes.

Figure 5:
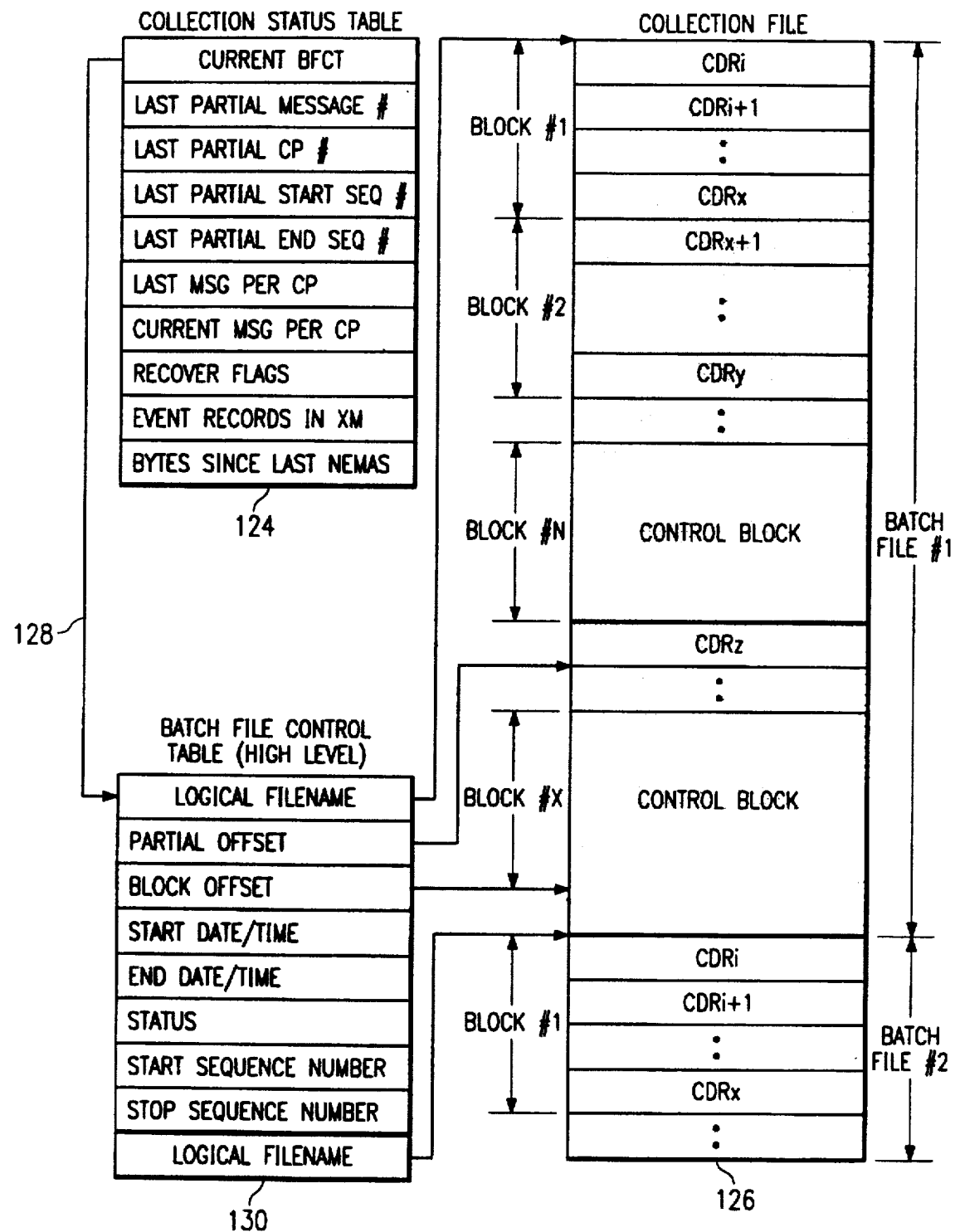
FIG. 5 is a block diagram of exemplary collection database table relationships according to the teachings of the present invention.

The batch file control table 130 has a predefined number of entries, where each entry defines a batch file currently residing on disk 116 (FIG. 4). Each entry contains information pertaining to that batch file such as the batch file's logical name, size, offset from the last collection buffer, status (open, closed, unused, dumped, overwritten, etc.), and information about the contents of that batch file. An exemplary batch file control table 130 is shown in FIG. 5. The contents of this table is periodically saved to disk for recovery purposes.

A batch file definition table has the same number of entries as the batch file control table and defines the batch file to collection file relationship for each batch file, such as the collection file block number the batch file starts, the collection file block number the batch file ends, and the number of blocks in the batch file. The table contents are saved to disk whenever changed (during create batch) for recovery purposes.

Figure 6:
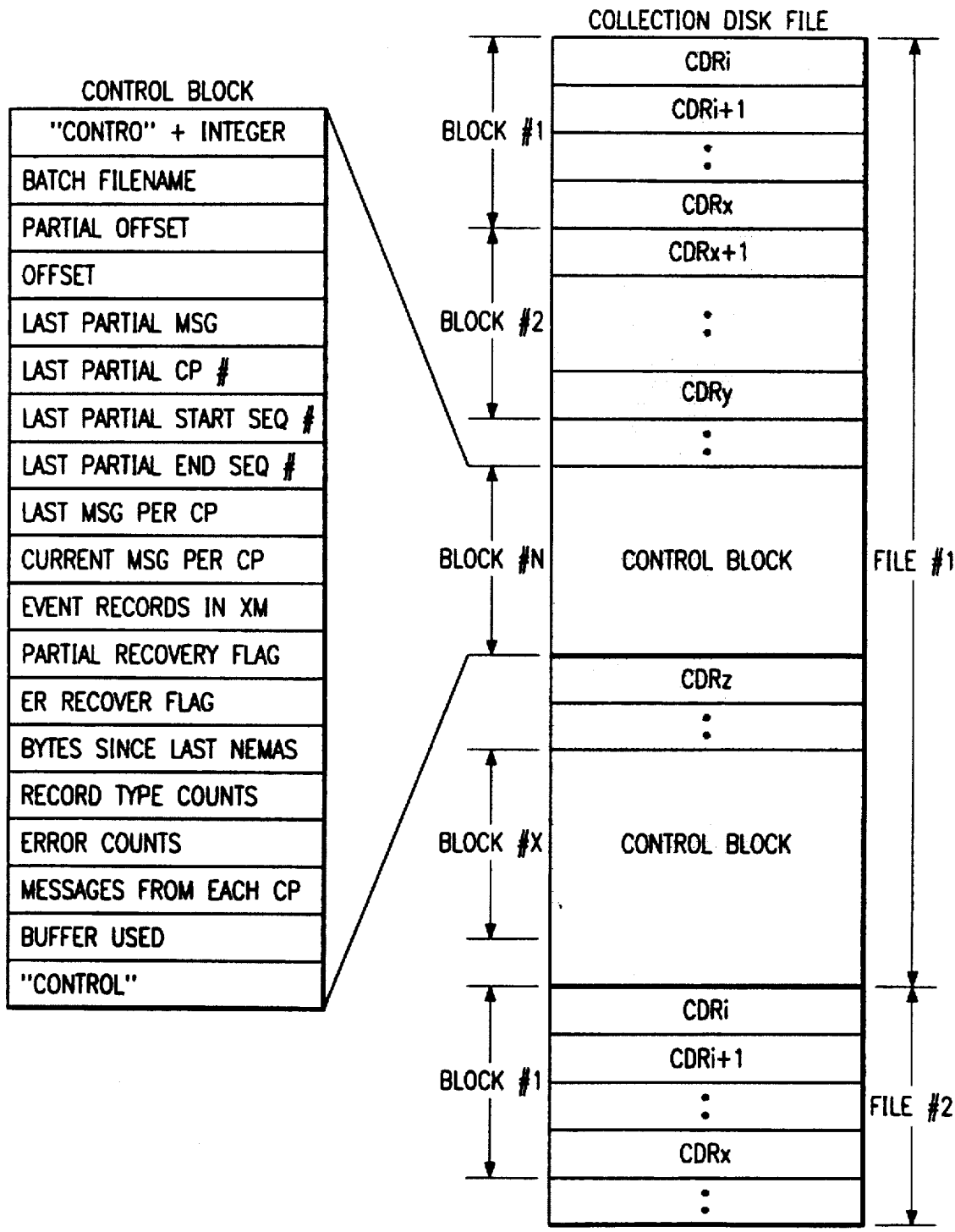
FIG. 6 is a block diagram of exemplary control block data according to the teachings of the present invention.

A control block table, defines the structure of the control block, an exemplary one of which being shown in FIG. 6, that is added to a collection buffer prior to writing the contents of collection buffer 114 to disk 116 (FIG. 4). The control block generally contains status information that was current at the time the collection buffer was completed. It is used for recovery and debugging purposes.

A diskmap table is built at initialization time and defines the current usage of collection file 126. The diskmap table contains the first and last used disk blocks and the first and last used batch file control table entries. It provides quick realtime access for the collection system. This table is built from the contents of both batch file definition table and batch file control table.

Another database, the collection data database, is used to store automatic message accounting data. This database includes the collection file (shown in FIG. 5), which contains the actual call records and a control block appended at the end of each collection buffer full of call records.

An event record table is included in the collection data database to maintain a circular queue of event records that have been input into automatic message accounting system 10 and processed and are in the process of being written to disk. Each event record has a status word that indicates whether the event record has been written to disk. The queue of event records is primarily used for recovery in the event of a processor outage. This table is preferably maintained in external memory with local read and write pointers to speed indexing into the table. In the event of a processor outage, the read and write pointers will be lost, so the status word in the event record table is used to search for those event records that have not yet been written to disk.

Another table in the collection data database is an error log table. This table is used to record any call records that system 10 cannot process. This may include records with invalid data, such as an invalid call record identifier, and records that have been formatted with an invalid billing format.

Man-machine interface commands may be further provided to allow the operator to change certain parameters stored in the databases. For example, a command is provided to change the alarm threshold stored in the collection threshold table. In addition, an easy to use user interface may be provided to prompt for and receive inputs for a number of operations, such as configuring a new call record format. After the user provides all the inputs, the tables necessary to configure the call records into the new format are automatically built. Constructed in this manner, maintenance and modification of the operations of database-driven automatic message accounting system 10 can be done without being knowledgeable about the structures of the databases and tables.

Although the present invention and its advantages have been described in detail, it should be understood that various changes, substitutions and alterations can be made therein without departing from the spirit and scope of the invention as defined by the appended claims.

What is claimed is:

1. An automated system for collecting and compiling call/event records, comprising:

a plurality of call data blocks each having data items related to at least one telephone call;

at least one table indexable by a predetermined data item in the call data block for determining a call/event record structure in response to a call type and call condition associated with the telephone call, the at least one table using the predetermined data item to identify the call type, the at least one table using the call type to identify the call condition or a program to determine the call condition; and a process accessing the call data blocks for retrieving the data items, the process creating the call/event records with the retrieved data items according to the at least one table.

2. The automated system, as set forth in claim 1, wherein the at least one table comprises at least one structure selection table having data structure information corresponding to a call type and call condition associated with the telephone call.

3. The automated system, as set forth in claim 2, wherein said at least one structure selection table includes:

a call type selection table having a list of call types; and a call condition selection table having a list of call conditions and program locations for determining call conditions.

4. The automated system, as set forth in claim 1, wherein the at least one table comprises a structure definition table having definitions of each field in the call data blocks and corresponding call/event records for the call type and call condition of the telephone call.

5. The automated system, as set forth in claim 3, wherein said call type selection table includes an index into said call condition selection table for each call type in order to identify the call condition or a program location to determine the call condition.

6. The automated system, as set forth in claim 1, wherein said call data blocks each includes a data item usable as an index into said at least one table.

7. The automated system, as set forth in claim 3, wherein said call data blocks each includes a data item usable as an index into said call type selection table.

8. The automated system, as set forth in claim 1, further comprising a field formatting table defining the positions of fields in the call data blocks and call/event records and further defining the attributes of data in the fields.

9. An automated system for collecting and compiling call/event records, comprising:

a plurality of call data blocks each having data items related to at least one telephone call;

at least one table indexable by a data item in the call data block for determining a call/event record structure in response to a call type and call condition associated with the telephone call;

a process accessing the call data blocks for retrieving the data items, and creating the call/event records with the retrieved data items according to the at least one table;

a field formatting table defining the positions of fields in the call data blocks and call/event records and further defining the attributes of data in the fields, wherein said at least one table comprises pointers to a first field formatting table having a definition of a source data field and pointers to a second field formatting table having a definition of a destination data field.

10. The automated system, as set forth in claim 9, wherein the definition of source and destination data fields comprises a position of the data field in the call data block and call/event record, respectively.

11. The automated system, as set forth in claim 9, wherein the definition of source and destination data fields comprises field size and data format.

12. An automated system for collecting and processing call data blocks and generating call/event records, comprising:
- a plurality of call data blocks each having data items related to at least one telephone call;
- at least one structure selection table indexable by a predetermined data item having data structure information corresponding to a call type and call condition associated with the telephone call, the at least one structure selection table using the predetermined data item to identify the call type, the at least one structure selection table using the call type to identify the call condition or a program to determine the call condition;
- a structure definition table having definitions of each field in the call data blocks and corresponding call/event records for the call type and call condition of the telephone call; and
- a process accessing the call data blocks for retrieving the data items, and creating the call records with the retrieved data items according to the at least one structure selection table and structure definition table.

13. The automated system, as set forth in claim 12, wherein said at least one structure selection table includes:
- a call type selection table having a list of call types; and
- a call condition selection table having a list of call conditions and program locations for determining call conditions.

14. The automated system, as set forth in claim 13, wherein said call type selection table includes an index into said call condition selection table for each call type in order to identify the call condition or a program location to determine the call condition.

15. The automated system, as set forth in claim 12, wherein said call data blocks each includes a data item usable as an index into said at least one structure selection table.

16. The automated system, as set forth in claim 14, wherein said call data blocks each includes a data item usable as an index into said call type selection table.

17. The automated system, as set forth in claim 12, further comprising a field formatting table defining the positions of fields in the call data blocks and call/event records and further defining the attributes of data in the fields.

18. An automated system for collecting and processing call data blocks and generating call/event records, comprising:
- a plurality of call data blocks related to at least one telephone call;
- at least one structure selection table having data structure information corresponding to a call type and call condition associated with the telephone call;
- a structure definition table having definitions of each field in the call data blocks and corresponding call/event records for the call type and call condition of the telephone call; and
- a process accessing the call data blocks for retrieving the data items, and creating the call records with the retrieved data items according to the at least one structure selection table and structure definition table;
- a field formatting table defining the positions of fields in the call data blocks and call/event records and further defining the attributes of data in the fields, wherein said structure definition table comprises pointers to a first field formatting table having a definition of a source data field and pointers to a second field formatting table having a definition of a destination data field.

19. The automated system, as set forth in claim 18, wherein the definition of source and destination data fields comprises a position of the data field in the call data block and call/event record, respectively.

20. The automated system, as set forth in claim 18, wherein the definition of source and destination data fields comprises field size and data format.

21. An automated method for processing call data blocks, comprising the steps of:
- collecting a plurality of call data blocks associated with a plurality of telephone calls;
- using a predetermined data item in each call data block to access a structure selection table according to a call type and call condition of the telephone call for determining data structures of the call data block and a call/event record, the predetermined data item identifying the call type, the call type identifying the call condition or a program to determine the call condition;
- defining a plurality of fields of the call data block and the call/event record according to a structure definition table;
- retrieving the data from the call data block according to the structure definition table; and
- inserting the data into the call/event record according to the structure definition table.

22. The method, as set forth in claim 21, further comprising the step of defining a position and attribute of each of the plurality of fields in the call data block and the call/event record according to field formatting tables.

23. The method, as set forth in claim 22, further comprising the steps of:
- using a call record identifier in the call data block to access a call type selection table having indices into a call condition selection table;
- accessing the call condition selection table having indices into the structure definition table corresponding to a plurality of predefined call types and call conditions; and
- accessing the structure definition table and determining the fields of the call data block and call/event record.

24. An automated method for processing call data blocks, comprising the steps of:
- collecting a plurality of call data blocks associated with a plurality of telephone calls;
- using a predetermined data item in each call data block to access a structure selection table according to a call type and call condition of the telephone call for determining data structures of the call data block and a call/event record;
- defining a plurality of fields of the call data block and the call/event record according to a structure definition table;
- retrieving the data from the call data block according to the structure definition table;
- inserting the data into the call/event record according to the structure definition table;
- defining a position and attribute of each of the plurality of fields in the call data block and the call/event record according to field formatting tables;
- using a call record identifier in the call data block to access a call type selection table having indices into a call condition selection table;
- accessing the call condition selection table having indices into the structure definition table corresponding to a plurality of predefined call types and call conditions;

accessing the structure definition table and determining the fields of the call data block and call/event record, wherein the step of accessing the structure definition table includes:

for each data item, determining the source and destination data fields of each data item in the call data block and call/event record, respectively, by accessing respective field definition tables; and determining the positions of the source and destination data fields in the call data block and call/event record.

25. The method, as set forth in claim 24, further comprising the step of determining the data format of the source and destination data fields in the call data block and call/event record.

26. The method, as set forth in claim 24, further comprising the step of converting the data format of the source data field in the call data block prior to insertion into the call/event record.

27. An automated method for processing call data blocks, comprising the steps of:

collecting a plurality of call data blocks associated with a plurality of telephone calls;

using a predetermined data item in each call data block to access a structure selection table according to a call type and call condition of the telephone call for determining data structures of the call data block and a call/event record;

defining a plurality of fields of the call data block and the call/event record according to a structure definition table;

retrieving the data from the call data block according to the structure definition table;

inserting the data into the call/event record according to the structure definition table; and changing the structure of the call/event record by changing the at least one structure definition table.

28. The method, as set forth in claim 22, further comprising the step of changing the format of the call/event record fields by changing the field formatting table.

29. An automated method for processing call data blocks, comprising the steps of:

collecting a plurality of call data blocks associated with a plurality of telephone calls;

using a predetermined data item in each call data block to access a structure selection table according to a call type and call condition of the telephone call for determining data structures of the call data block and a call/event record;

defining a plurality of fields of the call data block and the call/event record according to a structure definition table;

retrieving the data from the call data block according to the structure definition table;

inserting the data into the call/event record according to the structure definition table; and switching between n sets of structure selection table and structure definition table for dynamically switching the structure and format of the call/event records.

* * * * *